Figure 1:
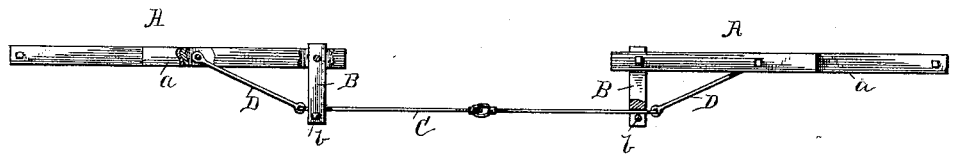

(No Model.)

B. A. RICE.
LOG BOOM.

No. 368,239. Patented Aug. 16, 1887.

Witnesses
Albert Speeiden
Alfred T. Gage

Inventor
Benjamin A. Rice

By his Attorney
Franklin H. Hough

N. PETERS, Photo-Lithographer, Washington, D. C.

UNITED STATES PATENT OFFICE.

BENJAMIN AJAX RICE, OF NEAR BARBOURSVILLE, KENTUCKY.

LOG-BOOM.

SPECIFICATION forming part of Letters Patent No. 368,239, dated August 16, 1887.

Application filed April 14, 1887. Serial No. 234,787. (No model.)

*To all whom it may concern:*

Be it known that I, BENJAMIN AJAX RICE, a citizen of the United States, residing near Barboursville, in the county of Knox and State of Kentucky, have invented certain new and useful Improvements in Log-Booms; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the construction of what are known as "log-booms;" and it has for its object to so construct the boom that a gate is formed and the two parts of the boom are held in position without the necessity of anchors or the like attached to the bank or shore; and to this end the invention consists in the peculiar combinations, and in the novel construction, arrangement, and adaptation of parts, all as more fully hereinafter described, shown in the drawings, and particularly defined in the claims.

The invention will be readily understood by those skilled in the art from the following description, when taken in connection with the accompanying drawings, in which—

Figure 2:
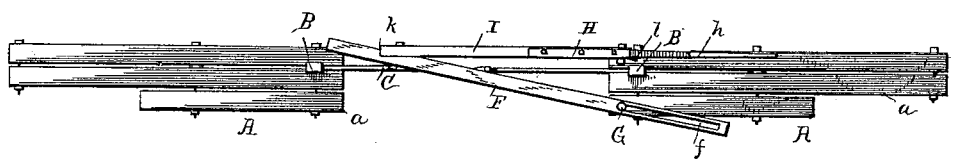
Figure 3:
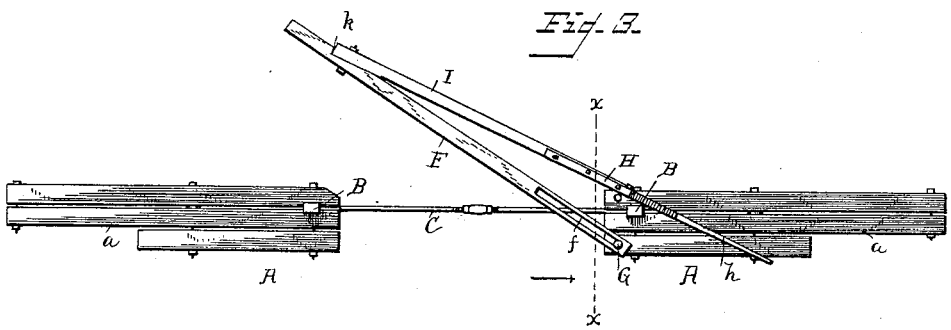
Figure 4:
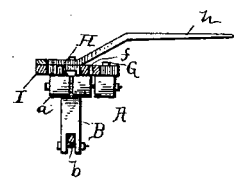
Figure 5:

Figure 1 represents a side elevation of a portion of a boom embodying some of the features of my invention, the gate and its operating means being removed. Fig. 2 is a top plan of the same with the gate closed. Fig. 3 is a like view with the gate open. Fig. 4 is a section on line *x x* of Fig. 3. Fig. 5 is a detail more particularly hereinafter referred to.

Referring to the details of the drawings, A A' designate platforms, each composed, preferably, of the timbers *a*, (preferably, though not necessarily, three in number,) rigidly secured together by bolts or otherwise. The inner or opposite ends of each of these platforms are provided with the usual hole or coupling means for securing the next adjacent section of the boom. (Not shown.) The adjacent ends of these platforms are arranged at a suitable distance apart, so as to leave a gap between them for the passage of logs when the gate is open.

I dispense with the anchoring-wires heretofore necessary to secure the ends of the boom upon opposite sides of the gap in position, and this is accomplished in the following manner: Pendent from the platforms in any suitable way, though preferably mortised into the logs composing the platform, as shown, are the posts or brackets B, the lower ends of which are slotted, as shown in Fig. 1. These posts extend beneath the bottom of the platform a sufficient distance to permit the passage of logs over the cable connecting their lower ends. This cable C has its ends passed through the slots in the lower ends of the posts B, above the bolt *b*, which connects the slotted ends of the posts and forms a support for the cable, which cable may be composed of a single piece or of two pieces connected together by a turn-buckle, which will permit of their being tightened to give rigidity to the parts when necessary from continued use. D D are brace-rods connecting the ends of the cable with the platforms. By this construction the platforms upon opposite sides of the gateway are secured together in the desired position without the necessity of any brace or anchor connected with the shore, the advantages of which will at once be apparent to every practical lumberman. In order to close this gap or opening when desired, I have provided the gate F, provided with a longitudinal slot, *f*, which engages the pin or bolt G, stationarily fixed at the inner end of the platform A.

H is a lever provided with an offset, *h*, so as to raise the handle of the same a suitable distance from the platform for convenience in operating, and I is a brace-bar secured to the end of said lever by bolts or other means, its forward end being cut away on a bevel to engage the notch *k* on the end of the gate, the opposite end being also beveled to engage a corresponding notch, *l*, formed on the inner end of the platform A.

To open the gate, the lever is operated to cause the gate to turn on the pin G, which as the gate opens rides in the slot *f* until the beveled inner end of the brace-bar engages the notch *l*, when the gate will have opened the desired distance, and the engagement of the beveled end of the brace-bar with the notch in the platform will hold the gate in the adjusted position.

From the above description, the operation and decided advantages of my improvement will be manifest, and a further explanation of the same is not deemed necessary.

What I claim to be new, and desire to secure by Letters Patent, is—

1. The combination, with two separated boom-sections, of a submerged cable connecting them together, leaving a passage for the passage of logs between them, substantially as described.

2. The combination, with two separated boom-sections, of a submerged cable connecting them together and brace-rods connecting said cable to the sections, substantially as described.

3. The combination, with the platforms A A', the slotted posts B, secured near the inner ends of said platforms, and bolts $b$ in the slotted ends of said posts, of the cable C, passed through the slots in said posts above said bolts, and the brace-rods D, connecting the ends of said cable with the platforms, substantially as described.

4. The combination, with the two boom-sections permanently arranged with a gap between them, of means for closing said gap, substantially as described.

5. The combination, with two separated boom-sections and a submerged connection for securing them at a regulated distance apart, of a gate pivoted to one of said sections and constructed to close the gap between the two, substantially as described.

6. The combination, with two boom-sections arranged with a space between them for the passage of logs and means for connecting them without obstructing the passage between them, of the pin G on one of said sections, a gate provided at one end with a slot engaging said pin, and means for operating said gate, substantially as described.

7. The combination, with the two boom-sections connected together, with an unobstructed passage between them, of the pin G upon one of said sections, a gate having at one end a slot engaging said pin, a brace-bar connected at one end with said gate and having its opposite end beveled to engage a notch in one of said sections, and an operating-lever secured to said brace-bar, substantially as described, and for the purpose set forth.

In testimony whereof I affix my signature in presence of two witnesses.

BENJAMIN AJAX RICE.

Witnesses:
- WM. GIRDNER,
- GEORGE T. CORUM.